United States Patent
Nieberlein (10) Patent No.: US 9,325,256 B2
(45) Date of Patent: Apr. 26, 2016

(54) METHOD FOR OPERATING AN INVERTER AND INVERTER OPERATING ACCORDING TO THE METHOD

(71) Applicant: Siemens Aktiengesellschaft, München (DE)

(72) Inventor: Klaus Nieberlein, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 149 days.

(21) Appl. No.: 14/196,382

(22) Filed: Mar. 4, 2014

(65) Prior Publication Data

US 2014/0254225 A1    Sep. 11, 2014

(30) Foreign Application Priority Data

Mar. 5, 2013   (EP) ..................................... 13157804

(51) Int. Cl.
*H02M 7/537*   (2006.01)
*H02M 7/217*   (2006.01)
*H02M 7/219*   (2006.01)

(52) U.S. Cl.
CPC ............ *H02M 7/2173* (2013.01); *H02M 7/219* (2013.01)

(58) Field of Classification Search
CPC ............................ H02M 7/2173; H02M 7/219
USPC .................................................. 363/127, 131
See application file for complete search history.

(56) References Cited

U.S. PATENT DOCUMENTS

| | | |
|---|---|---|
| 8,116,108 B2 * | 2/2012 | Becker et al. .................. 363/127 |
| 8,441,818 B2 * | 5/2013 | Damson et al. ................. 363/41 |
| 2010/0008118 A1 | 1/2010 | Becker et al. |

FOREIGN PATENT DOCUMENTS

| | | |
|---|---|---|
| CN | 1063382 A | 8/1992 |
| CN | 1720655 A | 1/2006 |
| CN | 102291083 A | 12/2011 |
| EP | 2 144 360 A1 | 1/2010 |
| EP | 2 525 486 A1 | 11/2012 |

* cited by examiner

*Primary Examiner* — Adolf Berhane
*Assistant Examiner* — Afework Demisse
(74) *Attorney, Agent, or Firm* — Henry M. Feiereisen LLC

(57) ABSTRACT

A method for operating an inverter and an inverter operating according to the method is disclosed, wherein the inverter is controlled in accordance with line-angle-specific control sets provided in a database, wherein a switchover from one control set to the next control set can be performed only in a direction of rotation of a space vector resulting from a respective line angle.

11 Claims, 6 Drawing Sheets

| HB1 | | HB2 | | HB3 | |
|---|---|---|---|---|---|
| + | T1 = 1 | + | T3 = 1 | + | T5 = 1 |
| | T2 = 0 | | T4 = 0 | | T6 = 0 |
| - | T1 = 0 | - | T3 = 0 | - | T5 = 0 |
| | T2 = 1 | | T4 = 1 | | T6 = 1 |
| 0 | T1 = 0 | 0 | T3 = 0 | 0 | T5 = 0 |
| | T2 = 0 | | T4 = 0 | | T6 = 0 |

FIG 5

| | HB1 | | HB2 | | HB3 | | | | | |
|---|---|---|---|---|---|---|---|---|---|---|---|
| | T1 | T2 | T3 | T4 | T5 | T6 | | | | | |
| 1 | 1 | 0 | 0 | 0 | 0 | 1 | $\varphi_0+\varphi_v$ | $<$ | $\varphi$ | $<$ | $\varphi_{60}-\varphi_v$ | ~32 |
| | 1 | 0 | 1 | 0 | 0 | 1 | $\varphi_{60}-\varphi_v$ | $\leq$ | $\varphi$ | $\leq$ | $\varphi_{60}+\varphi_v$ | ~38 |
| 2 | 0 | 0 | 1 | 0 | 0 | 1 | $\varphi_{60}+\varphi_v$ | $<$ | $\varphi$ | $<$ | $\varphi_{120}-\varphi_v$ | ~32 |
| | 0 | 1 | 1 | 0 | 0 | 1 | $\varphi_{120}-\varphi_v$ | $\leq$ | $\varphi$ | $\leq$ | $\varphi_{120}+\varphi_v$ | ~38 |
| 3 | 0 | 1 | 1 | 0 | 0 | 0 | $\varphi_{120}+\varphi_v$ | $<$ | $\varphi$ | $<$ | $\varphi_{180}-\varphi_v$ | ~32 |
| | 0 | 1 | 1 | 0 | 1 | 0 | $\varphi_{180}-\varphi_v$ | $\leq$ | $\varphi$ | $\leq$ | $\varphi_{180}+\varphi_v$ | ~38 |
| 4 | 0 | 1 | 0 | 0 | 1 | 0 | $\varphi_{180}+\varphi_v$ | $<$ | $\varphi$ | $<$ | $\varphi_{240}-\varphi_v$ | ~32 |
| | 0 | 1 | 0 | 1 | 1 | 0 | $\varphi_{240}-\varphi_v$ | $\leq$ | $\varphi$ | $\leq$ | $\varphi_{240}+\varphi_v$ | ~38 |
| 5 | 0 | 0 | 0 | 1 | 1 | 0 | $\varphi_{240}+\varphi_v$ | $<$ | $\varphi$ | $<$ | $\varphi_{300}-\varphi_v$ | ~32 |
| | 1 | 0 | 0 | 1 | 1 | 0 | $\varphi_{300}-\varphi_v$ | $\leq$ | $\varphi$ | $\leq$ | $\varphi_{300}+\varphi_v$ | ~38 |
| 6 | 1 | 0 | 0 | 1 | 0 | 0 | $\varphi_{300}+\varphi_v$ | $<$ | $\varphi$ | $<$ | $\varphi_{360}-\varphi_v$ | ~32 |
| | 1 | 0 | 0 | 1 | 0 | 1 | $\varphi_{360}-\varphi_v$ | $\leq$ | $\varphi$ | $\leq$ | $\varphi_0+\varphi_v$ | ~38 |
| | | | | | | | | | | | | |
| 7 | 0 | 0 | 0 | 0 | 0 | 0 | | | | | | |

| X | X1 | X2 | X3 | X4 | X5 | X6 | X7 |
|---|---|---|---|---|---|---|---|
| 1 | $\varphi < \varphi_{60} - \varphi_v$ | $\varphi < \varphi_{60} + \varphi_v$ | sector = 1<br>+ 0 - | adc_L1 > adc_L2 | sector = 2<br>+ + - | $\varphi > \varphi_{300} - \varphi_v$ | $\varphi = \varphi - 2\pi$ |
| 2 | $\varphi < \varphi_{120} - \varphi_v$ | $\varphi < \varphi_{120} + \varphi_v$ | sector = 2<br>0 + - | adc_L3 < adc_L1 | sector = 3<br>- + - | — | — |
| 3 | $\varphi < \varphi_{180} - \varphi_v$ | $\varphi < \varphi_{180} + \varphi_v$ | sector = 3<br>- + 0 | adc_L2 > adc_L3 | sector = 4<br>- + + | — | — |
| 4 | $\varphi < \varphi_{240} - \varphi_v$ | $\varphi < \varphi_{240} + \varphi_v$ | sector = 4<br>- 0 + | adc_L1 < adc_L2 | sector = 5<br>- - + | — | — |
| 5 | $\varphi < \varphi_{300} - \varphi_v$ | $\varphi < \varphi_{300} + \varphi_v$ | sector = 5<br>0 - + | adc_L3 > adc_L1 | sector = 6<br>+ - + | $\varphi < \varphi_{60} - \varphi_v$ | $\varphi = \varphi + 2\pi$ |
| 6 | $\varphi < \varphi_{300} + \varphi_v$ | $\varphi < \varphi_{300} - \varphi_v$ | sector = 6<br>+ - 0 | adc_L2 < adc_L3 | sector = 1<br>+ - - | — | — |

| Y | Y1 | Y2 | Y3 | Y4 | Y5 | Y6 | Y7 |
|---|---|---|---|---|---|---|---|
| 1 | $\varphi > \varphi_0 + \varphi_v$ | $\varphi > \varphi_0 - \varphi_v$ | sector = 1<br>+ 0 - | adc_L3 ≤ adc_L1 | sector = 6<br>+ - - | $\varphi > \varphi_{300} + \varphi_v$ | $\varphi = \varphi - 2\pi$ |
| 2 | $\varphi > \varphi_{60} + \varphi_v$ | $\varphi > \varphi_{60} - \varphi_v$ | sector = 2<br>0 + - | adc_L2 ≥ adc_L1 | sector = 1<br>+ + - | — | — |
| 3 | $\varphi > \varphi_{120} + \varphi_v$ | $\varphi > \varphi_{120} - \varphi_v$ | sector = 3<br>- + 0 | adc_L1 ≤ adc_L3 | sector = 2<br>- + - | — | — |
| 4 | $\varphi > \varphi_{180} + \varphi_v$ | $\varphi > \varphi_{180} - \varphi_v$ | sector = 4<br>- 0 + | adc_L3 ≥ adc_L2 | sector = 3<br>- + + | — | — |
| 5 | $\varphi > \varphi_{240} + \varphi_v$ | $\varphi > \varphi_{240} - \varphi_v$ | sector = 5<br>0 - + | adc_L2 ≤ adc_L1 | sector = 4<br>- - + | — | — |
| 6 | $\varphi > \varphi_{300} + \varphi_v$ | $\varphi > \varphi_{300} - \varphi_v$ | sector = 6<br>+ - 0 | adc_L1 ≥ adc_L3 | sector = 5<br>- - + | $\varphi < \varphi_{60} - \varphi_v$ | $\varphi = \varphi + 2\pi$ |

METHOD FOR OPERATING AN INVERTER AND INVERTER OPERATING ACCORDING TO THE METHOD

CROSS-REFERENCES TO RELATED APPLICATIONS

This application claims the priority of European Patent Application, Serial No. 13157804.9, filed Mar. 5, 2013, pursuant to 35 U.S.C. 119(a)-(d), the content of which is incorporated herein by reference in its entirety as if fully set forth herein.

BACKGROUND OF THE INVENTION

The present invention relates to a method for operating an inverter, in particular a three-phase inverter in any event comprising controllable semiconductor switches. Furthermore, the invention also relates to a method for operating an inverter of said type which is incorporated in a drive control unit. Finally, the invention also relates to an inverter of said type operating according to the method as well as to a drive control unit having an inverter of said type operating according to the method.

The following discussion of related art is provided to assist the reader in understanding the advantages of the invention, and is not to be construed as an admission that this related art is prior art to this invention.

Power inverters and drive control units having an inverter are known per se. The same applies to the customary methods for operating such inverters. A well-established method for operating an inverter is known in the technical literature under the keyword space vector modulation.

What is still not ideal at the present time is that in prior art approaches miscommutations and the like can only be avoided with a comparatively high investment of effort and resources.

It would therefore be desirable and advantageous to obviate prior art shortcomings and to provide an improved method for avoiding miscommutations by an inverter, in particular miscommutations and high-frequency switching between two states.

SUMMARY OF THE INVENTION

According to one aspect of the present invention, a method for operating a three-phase inverter having controllable semiconductor switches includes measuring input voltages present at the inverter for determining a line angle, and determining from the line angle a position of a rotating space vector, providing in a database a plurality of line-angle-specific control sets for conducting states (conducting state control sets) and a plurality of line-angle-specific control sets for transition states (transition state control sets), wherein each of the conducting state control sets is configured to activate precisely one upper semiconductor switch and precisely one lower semiconductor switch of the inverter, wherein each of the transition state control sets is configured to activate precisely two upper or lower semiconductor switches and to activate precisely one lower or upper semiconductor switch of the inverter, wherein the conducting state control sets and the transition state control sets define sectors which succeed one another alternately and at least partially overlapping in a direction of rotation of the rotating space vector, determining in the database a conducting state control set or transition state control set associated with the determined line angle as a basis for control signals for controlling the semiconductor switches, during a transition from a conducting state control set to a transition state control set, controlling the semiconductor switches with new control signals in accordance with the control signals based on the transition state control set, when a transition state control set is valid, monitoring the input voltages of the inverter and selecting, when the monitored input voltages satisfy a predefined condition, the next-following conducting state control set in the respective direction of rotation of the space vector, and controlling and commutating the semiconductor switches with new control signals in accordance with the control signals based on the conducting state control set, and blocking a sector having a conducting state control set or a transition state control set that was already used as a basis for the control signals, wherein the blocked sector is disposed prior in relation to the line angle in the direction of rotation of the space vector.

The semiconductor switches may be, for example, devices called IGBTs. During operation the inverter is supplied with line-side input voltages in a per se known manner, for example via the three phases of a three-phase power supply network, and a respective line angle $\phi$, and hence also a direction of a space vector rotating at the line angle $\phi$, is determined by measurement of the input voltages present at the inverter.

According to the method, a plurality of line-angle-specific control sets for conducting states and a plurality of line-angle-specific control sets for transition states are held available in a database. The term "line angle specific" in this context means that the respective control set applies to predefined line angles or predefined line angle intervals. In the case of a space vector rotating at the line angle $\phi$ this accordingly results in line angles between 0° and 359° in a full revolution of the space vector. A line-angle-specific control set is thus a control set that has been defined for line angles $\phi$ between 0° and 60°, for example. The database contains a plurality of such line-angle-specific control sets for conducting states. In this case a transition state is defined on a line-angle-specific basis between two conducting states in each case. With a first and a second control set for conducting states for line angles $\phi$ between 10° and 50° and 70° and 110° respectively, for example, a control set for a transition state is provided therebetween on a line-angle-specific basis. The control set for the transition state applies for example to line angles $\phi$ between 51° and 69°.

The line-angle-specific control sets for conducting states are referred to hereinafter as conducting state control sets for short. Similarly, the line-angle-specific control sets for transition states are referred to as transition state control sets.

A conducting state is a situation in which precisely one upper semiconductor switch of a half-bridge of the inverter and precisely one lower semiconductor switch of another half-bridge of the inverter are activated, i.e. conducting. Accordingly, the conducting state control sets in each case provide for the activation of precisely one upper semiconductor switch and precisely one lower semiconductor switch of the inverter.

A transition state is a situation in which either two lower or two upper semiconductor switches are conducting (activated, closed) and, in complementary fashion, an upper and a lower semiconductor switch, respectively, are closed. Accordingly, the transition state control sets in each case provide for the activation of precisely two upper or lower semiconductor switches and the activation of precisely one lower and upper semiconductor switch, respectively, of the inverter.

The conducting state control sets and the transition state control sets define sectors which follow one another in alternation in a respective direction of rotation of the space vector. For purposes of differentiation the sectors defined by the transition state control sets are referred to as commutation sectors.

According to the method, the determined line angle $\phi$ is used to determine a conducting state or transition state control set associated with the respective line angle in the database as a basis for control signals for gate control of the semiconductor switches. The database can be a table or the like. However, a storage of the data determining the respective control set and distributed in a control program for example is also to be deemed a database. In that case the control program itself is the database.

In a transition from a conducting state control set to a transition state control set taking place according to the respective line angle $\phi$ there is, according to the method, immediately or in a close time relationship a new gating of the semiconductor switches according to the control signals resulting on account of the respective transition state control set. The conducting state is thus deactivated, but still no commutation takes place at this time.

According to the method, the input voltages of the inverter are monitored during the validity of a transition state control set. According to the method, when a predefined or predefinable condition in relation to the monitored input voltages is reached, the next-following conducting state control set in the respective direction of rotation of the space vector is selected. Then a new gating of the semiconductor switches is performed and a commutation takes place according to the control signals for the semiconductor switches resulting on account of said conducting state control set.

In this case, according to the method, a preceding sector, starting from the respective line angle $\phi$ in the direction of rotation of the space vector, the underlying control set of which sector has already been used as a basis for control signals, is blocked.

The inverter therefor outputs the electrical energy present on the line side on account of the discretely activatable conducting state control sets and the signal states accordingly permanently assigned to the output drivers for activating and deactivating individual semiconductor switches as a blocking current.

When a line angle $\phi$ typically acting as a commutation point is reached, i.e. during operation at a fundamental frequency at line angles $\phi$ of 60°, 120°, 180°, 240°, 300° and 360°/0°, a transition state control set is already selected in the case of the operating method presented here. Because the transition state control sets for line angle intervals are fixed around the commutation points, the transition state control sets are already valid before the commutation points. During the entire validity of a transition state control set the phases normally commutated at the commutation point are monitored. If a predefined or predefinable condition then occurs in relation to the input voltages there, the commutation condition is fulfilled during the transition state and commutation takes place. The commutation is effected in that the next-following conducting state control set in the respective direction of rotation of the space vector is selected from the database. A new gating of the semiconductor switches of the inverter is performed according to the control signals resulting on account of said conducting state control set. A commutation to the new phase thus takes place as a result.

The inverter is, for example, an inverter incorporated in a drive control unit. Furthermore, the inverter is for example a regenerative feedback inverter, in particular a regenerative feedback inverter having what is termed a slim intermediate circuit.

With the invention, due to a limited number of control sets—the conducting state control sets and the transition state control sets—the former analog gate control of an inverter can advantageously be implemented as a discrete gate control on a line-angle-specific basis. Miscommutations are reliably avoided because preceding sectors, starting in each case from the current line angle $\phi$ in the direction of rotation of the space vector, the underlying control set of which sector has already been used as a basis for control signals, are blocked. Furthermore, an undesirable switchover, specifically a high-frequency switching back and forth between two states that has sometimes been observed in practice, is reliably prevented. As a result of the introduction of the intermediate states, in which the previously valid conducting state in each case has already been deactivated, it is ensured that oscillations that make the accurate detection of the commutation condition more difficult quickly decay or do not even develop in the first place. By monitoring the phases to be commutated in each case and the input voltages of the inverter present there during power infeed operation it is possible to detect the occurrence of the commutation condition and to initiate the commutation by transition to the next-following conducting state and the corresponding conducting state control set.

Advantageous embodiments of the invention are the subject matter of the dependent claims. Back-references used therein point to the further embodiment of the subject matter of the main claim on the basis of the features of the respective dependent claim. They are not to be understood as a renunciation of the achievement of an independent, objective protection for the feature combinations of the related dependent claims. With regard to an interpretation of the claims in a more detailed concrete formulation of a feature in a subordinate claim, it is furthermore to be assumed that such a restriction is not present in the respective preceding claims.

When a switchover to the next-following conducting state control set in the respective direction of rotation of the space vector is made at the end of the validity period of a transition state control set at the latest, a forced commutation has been implemented. The forced commutation consists in a switchover to the next-following conducting state control set being performed in any event at the end of the validity period of a transition state control set and consequently a commutation takes place. The forced commutation at the end of the validity period of a transition state control set is therefore independent of whether a fulfillment of the condition for the commutation monitored during the period of validity of the transition state control set has occurred therein.

According to another aspect of the invention, an inverter, in particular an inverter incorporated in a drive control unit, is intended and configured to operate according to the above-outlined method and where applicable also according to particular embodiments of the method.

For that purpose it is provided that the inverter operates according to the method as described here and hereinafter and toward that end includes means for performing the method. In this case the invention is preferably implemented in software and/or firmware. This means that on the one hand the invention is also a control program in the form of a computer program having program code instructions that are executable by a computer and on the other hand a storage medium having a computer program of said kind, i.e. a computer program product having program code means, as well as finally also an inverter having an inverter control device comprising in a per se known manner a processing unit in the form or manner of a microprocessor as well as a memory, such a control/computer program being loaded or loadable into the memory of the inverter control device. Such a control program or an implementation of the functionality of such a control program in firmware is thus a means for performing the method and where applicable its embodiments. Further means for performing the method are the inverter control device and—if the invention is implemented in software—the processing unit contained therein and the memory containing the control program held available there.

Advantageous embodiments of the inverter will emerge from an implementation, in particular an implementation in software and/or firmware, of individual or multiple described features.

With the invention and its embodiments, the inverter can now advantageously be controlled by digital gating means. At the same time the switchover process is cleanly defined. In the event of commutation, no oscillations can occur which in the worst case can escalate to the point where the device referred to here as a drive control unit is shut down. Furthermore, when the method is applied, a commutation results very close to the desired switching time instants and moreover without great time delays resulting on account of strong filters, which delays would lead to high capacitive compensating currents.

The exemplary embodiment or each exemplary embodiment is not to be understood as a limitation of the invention. Rather, variations and modifications are also possible within the scope of the present disclosure, in particular such variants and combinations which can be derived on the part of the person skilled in the art for example through combination or variation of individual features or elements or method steps described in conjunction with those described in the general or specific description part and contained in the claims and/or drawing with regard to the achievement of the object and which lead by means of combinable features to a new subject matter or to new method steps or method step sequences.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 7 is a tabular representation of the conditions tested within the flowchart.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
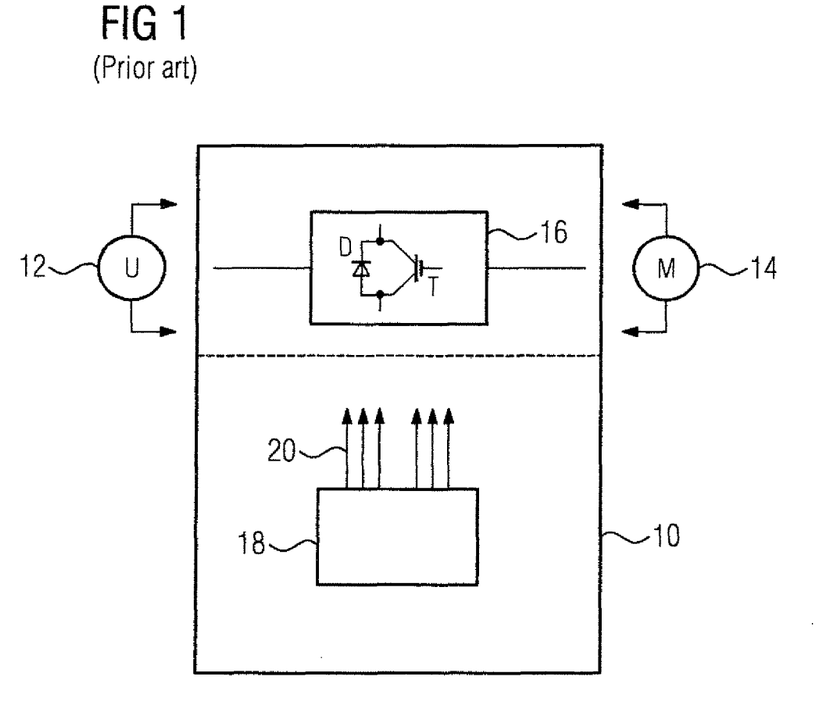
FIG. 1 shows a conventional drive control unit having an inverter on a high-voltage side and an inverter control device for generating control signals for the inverter on a low-voltage side.

Turning now to the drawing, and in particular to FIG. 1, there is shown in simplified schematic form a drive control unit 10 which is or can be connected to a voltage source 12 on the input side and to which a load is or can be connected on the output side. The connected load can be for example a speed-regulated electric motor 14. The drive control unit 10 comprises an inverter 16 having a per se known bridge circuit (represented only schematically), in particular in an embodiment as an IGBT-B6 bridge, which is populated with controllable semiconductor switches T and antiparallel diodes D.

An inverter control device 18 is provided for gate control of the semiconductor switches T of the inverter 16. On the basis of gate control logic for each semiconductor switch T incorporated in the inverter control device 18, the inverter control device 18 generates a control signal 20 which is supplied directly or indirectly, for example by means of an intermediately connected output driver, to the respective semiconductor switch T.

The inverter 16 belongs to a high-voltage side of the drive control unit 10. The inverter control device 18, in contrast, belongs to a low-voltage side of the drive control unit 10. In the schematic, high-voltage side and low-voltage side are separated by a dashed line and a potential separation is typically provided between the high-voltage side and low-voltage side.

Figure 2:
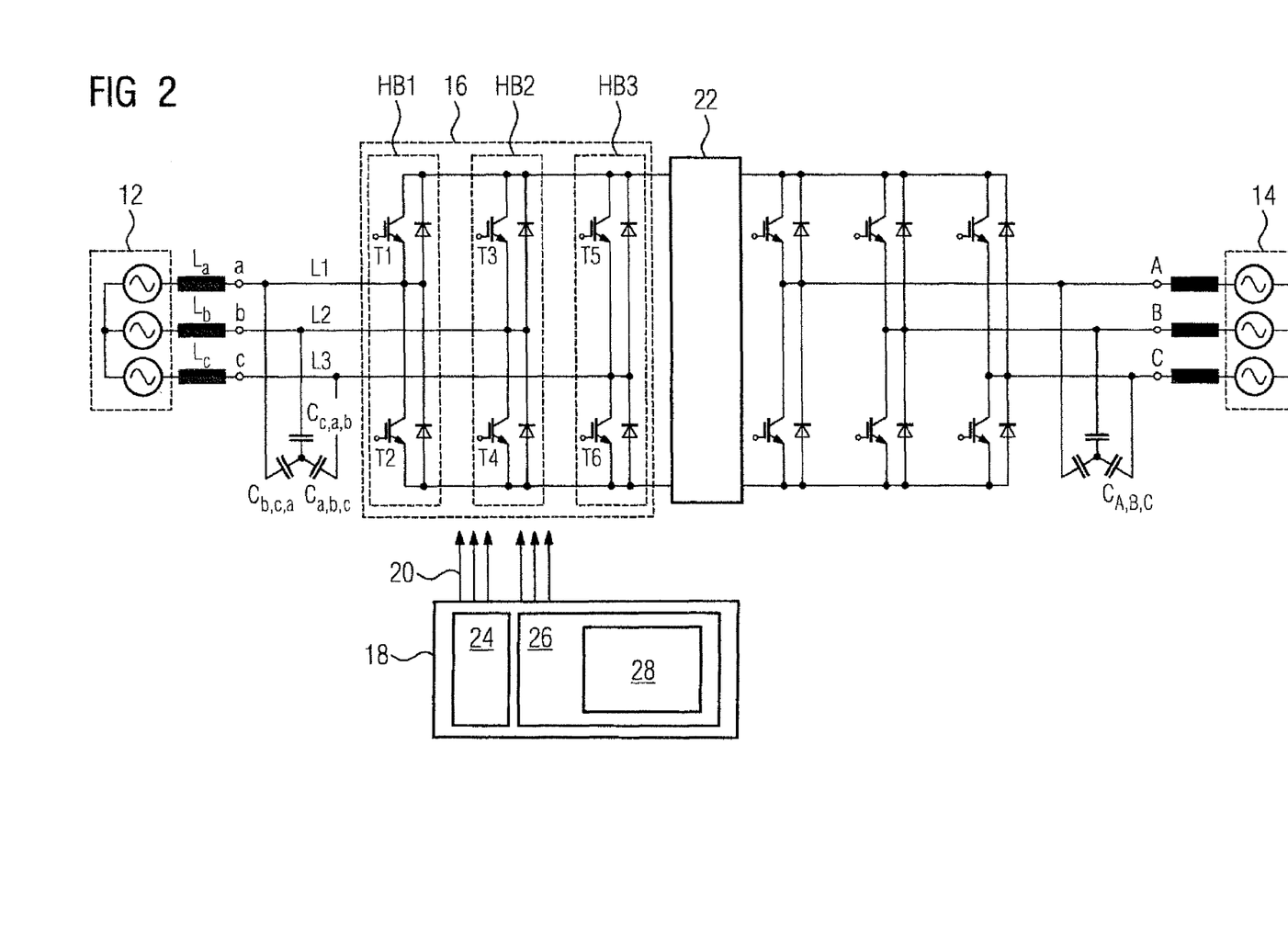
FIG. 2 shows a conventional circuit of a drive control unit according to FIG. 1.

The schematic in FIG. 2 shows with further details a per se known circuit of a drive control unit 10 having a line-side inverter 16 and the semiconductor switches T incorporated therein, which are designated by T1, T2, T3, T4, T5 and T6 for unique referencing purposes, and a load-side inverter that is not designated further. Following the line-side inverter 16, and thus interposed between the latter and the load-side inverter, the circuit comprises in a per se known manner an intermediate circuit 22, for example a current intermediate circuit or a voltage intermediate circuit.

The method presented here can be applied for the purpose of gate control of a line-side inverter 16. Even though in this case the two inverters 16 incorporated in the circuit of a drive control unit 10 are represented with identical topology, different topologies by all means also come into consideration, for example three-phase on the input side and two-phase on the load side or vice versa. The method presented here is not limited to inverters 16 having a three-phase topology, but is also intended and usable for inverters based on other topologies.

Also shown in the schematic in FIG. 2 on the input side in association with each phase L1, L2, L3 are the line inductors $L_a$, $L_b$, $L_c$. The capacitors combined at a star point are designated by $C_{a,b,c}$, $C_{b,c,a}$ and $C_{c,a,b}$ and represent the capacitances between the points designated by a, b and c. For simplified reference reasons the so-called half-bridges of the inverter 16 having the semiconductor switches T1, T2; T3, T4; T5, T6 assigned in pairs to a phase in each case are designated by HB1, HB2 and HB3. A first half-bridge HB1 assigned to the phase L1 comprises the semiconductor switches designated by T1 and T2. A second half-bridge HB2 assigned to the phase L2 comprises the semiconductor switches designated by T3 and T4, and a third half-bridge HB3 assigned to the phase L3 comprises the semiconductor switches designated by T5 and T6.

With regard to the inverter control device 18, it is shown that the latter comprises a processing unit 24 in the form or manner of a microprocessor and a memory 26. A control program 28 for generating control signals 20 and consequently for gate control of the semiconductor switches T1-T6 according to the gate control scheme integrated in the control program 28 is loaded into the memory 26. The gate control scheme is an implementation of the present method for operating an inverter 16 in software. Instead of a control program 28 containing individual program code instructions the method described here and hereinafter can also be implemented in the form of firmware. It is clear to the person skilled in the art that it is also always possible to implement a method in firmware or in firmware and software or in firmware and hardware instead of implementing the same in software. It shall therefore hold for the description presented here that other implementation possibilities, namely in particular an implementation in firmware or in firmware and software or in firmware and hardware, are also encompassed by the term software or the terms control program and computer program.

Figure 3:
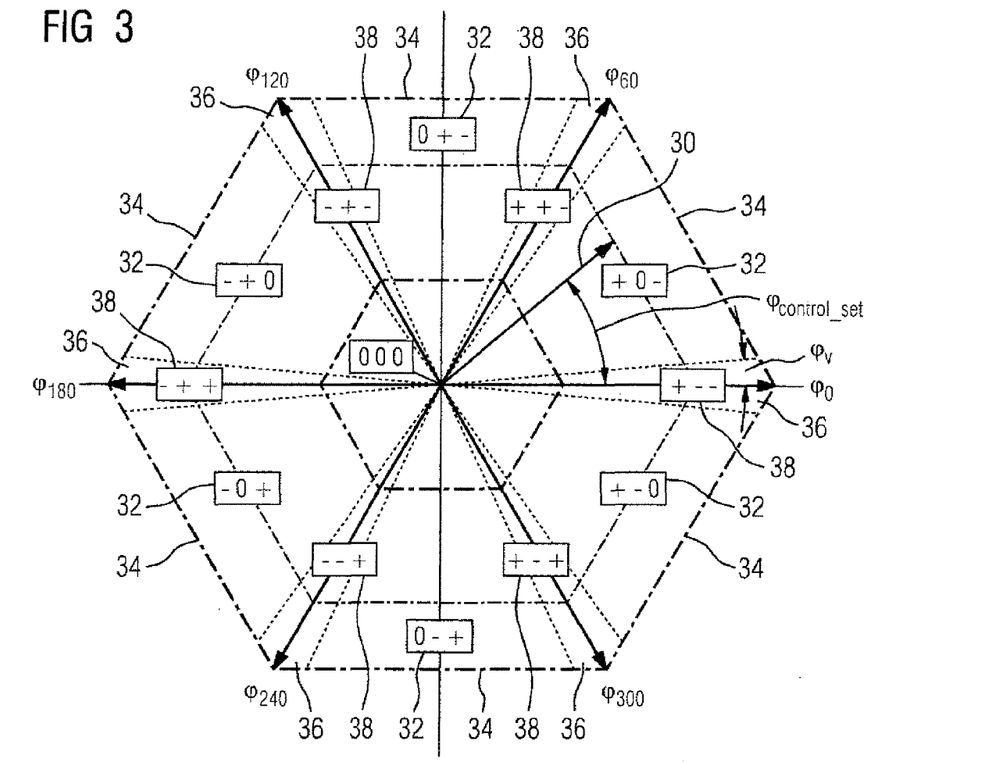
FIG. 3 is a space vector diagram according to the present invention.

The schematic in FIG. 3 shows a snapshot of a rotating space vector 30 on the basis of a per se known space vector diagram. The position of the space vector 30 results on account of a line angle $\phi$ that is determined in each case. This results for its part from a measurement of the input voltages present at the inverter 16.

The diagram in FIG. 3 comprises six main sectors, each of which is assigned to specific line angle intervals. A first main sector comprises the line angle interval from $\phi=0°$ to $\phi=60°$. A second main sector comprises the line angle interval from $\phi=60°$ to $\phi=120°$. A third main sector comprises the line angle interval from $\phi=120°$ to $\phi=180°$, and so on.

Each main sector is assigned a sector 34 defined by a conducting state control set 32. The assignment also applies in reverse, however, because each conducting state control set 32, and consequently each conducting state resulting in each case, is defined for a specific line angle interval. Three symbols are shown in the diagram for each conducting state control set 32, these representing the data included in the conducting state control set 32 in addition to the specification of the respective line angle interval. The reader is referred to the table shown in FIG. 4 for an explanation of these symbols.

Figure 4:
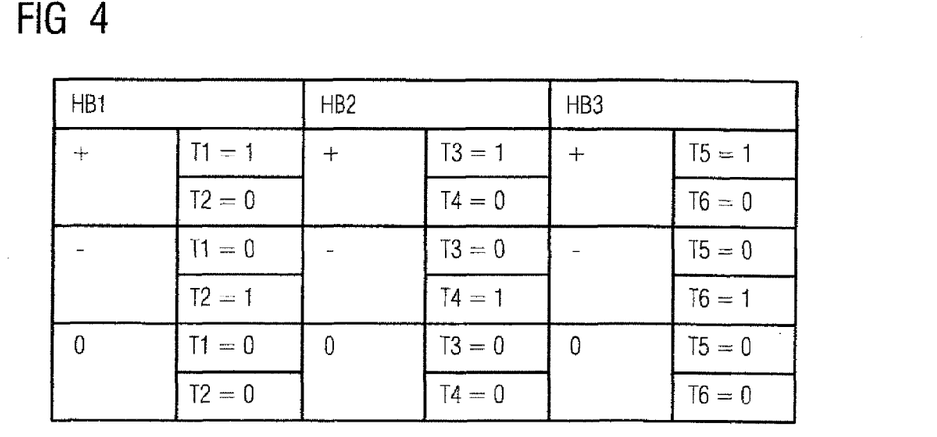
FIG. 4 is a table for interpreting the conducting and transition state control sets shown symbolically in FIG. 3.

FIG. 4 shows a table comprising six columns, the first two columns applying to the first half-bridge HB1 (FIG. 2) of the inverter 16, the third and fourth column to the second half-bridge HB2 of the inverter 16, and the last two columns to the third half-bridge HB3 of the inverter 16. The columns associated in pairs in each case in this way show on the left-hand side the symbols that are also used to represent the conducting state control sets 32, and on the right-hand side the associated states of the respective semiconductor switches T1, T2; T3, T4; T5, T6 of the respective half-bridges HB1, HB2, HB3.

The conducting state control set 32 of the first sector 34 represented by the symbols "+", "0" and "−" accordingly signifies an activation of the semiconductor switch T1, a deactivation of the semiconductor switch T2 (FIG. 4: column 2, upper field), a deactivation of the two semiconductor switches T3 and T4 (FIG. 4: column 4, lower field) incorporated in the second half-bridge HB2, and a deactivation of the semiconductor switch T5 and an activation of the semiconductor switch T6 (FIG. 4: column 6, middle field). As for the other conducting state control sets 32, this interpretation scheme applies analogously to the symbols shown there in each case. On account of the conducting state control sets 32 the respective control signals 20 (FIG. 2) are generated for the corresponding gate control of the semiconductor switches T1-T6.

In short it can be said with regard to the interpretation of the table shown in FIG. 4 that the symbol "+" in each case signifies the activation of an upper semiconductor switch T1, T3, T5 and the deactivation of the associated lower semiconductor switch T2, T4, T6 in the same half-bridge HB1, HB2, HB3. Analogously, the symbol "−" in each case signifies the deactivation of an upper semiconductor switch T1, T3, T5 and the activation of the associated lower semiconductor switch T2, T4, T6 in the same half-bridge HB1, HB2, HB3. The symbol "0" signifies the deactivation of an upper semiconductor switch T1, T3, T5 and the deactivation of the associated lower semiconductor switch T2, T4, T6 in the same half-bridge HB1, HB2, HB3.

Because each conducting state control set 32 includes the symbol "+" precisely once and likewise the symbol "−" precisely once, following a generation of corresponding control signals 20, precisely one upper semiconductor switch T1, T3, T5 and precisely one lower semiconductor switch T2, T4, T6 are closed (activated, conducting), while the other semiconductor switches T1-T6 are open (deactivated, non-conducting). Such a constellation represents a conducting state, since the intermediate circuit 22 is connected to two of the three phases L1, L2, L3. Depending on sector 34 and the conducting state control set 32 valid there, different phases L1, L2, L3 are in this case connected to the intermediate circuit 22 and the switchover of the phases L1, L2, L3 represents the commutation.

Also shown in the schematic in FIG. 3 in addition to the conducting state control sets 32 are six transition state control sets 38 belonging to six commutation sectors 36 in each case. With regard to the interpretation of the symbols incorporated in the transition state control sets 38, the reader is referred to the above explanation and the table shown in FIG. 4. Each transition state control set 38 is assigned to a (non-designated) sector of the space vector diagram and accordingly each transition state control set 32 also includes a specification of the respective line angle interval.

Each transition state control set 38 belongs to a transition state defined on a line-angle-specific basis by the underlying commutation sector 36 in each case and the transition states are in each case located between two conducting states. Conducting and transition states therefore succeed one another in alternation. A width of the commutation sectors 36, and consequently a validity range of the transition states, results at a predefined or predefinable aperture angle of the commutation sectors 36, which is indicated in the diagram by $\phi_v$. The letter v used as an index can also be interpreted as formed from two diagonal limbs. In this respect the letter v symbolizes an angle included by the two limbs, in this case therefore the aperture angle $\phi_v$ of the commutation sectors 36, to each of which a transition state, and accordingly a transition state control set 38, is assigned.

The aperture angle $\phi_v$ is either permanently predefined or, in a special embodiment variant of the method described here, variable. The aperture angle $\phi_v$ is variable for example in the sense that it is set within the scope of a parameterization of the inverter control device 18 and thus is predefined for further use.

Because each transition state control set 38 in each case includes precisely two identical symbols, for example "−", "−", "+" or "+", "+", "−", and no symbol "0", precisely two upper or lower semiconductor switches T1-T6 are always activated during a transition state, with the result that two phases L1, L2, L3 are short-circuited and consequently voltage dips during the down-commutation of a phase L1, L2, L3 can be avoided or at least reduced. Furthermore, when two upper semiconductor switches T1, T3, T5 are activated, precisely one lower semiconductor switch T2, T4, T6 is activated. When two lower semiconductor switches T2, T4, T6 are activated, precisely one upper semiconductor switch T1, T3, T5 is accordingly activated. The other semiconductor switches T1-T6 are deactivated.

The outer and inner limits indicated by a dash-dotted line denote the locations at which the line input vector exceeds maximum or minimum permissible voltages, which leads to a deactivation of the semiconductor switches T1-T6. A special control set, described further below, can be provided for that purpose.

The conducting state control sets 32 and the transition state control sets 38 are incorporated in the control program 28. The control program 28 therefore represents a database 28 comprising said control sets 32, 38. In principle the control sets 32, 38 can also be held available in an external database set up in the memory 26. This (likewise possible) situation is not shown, so the control program 28 is sometimes referred to here and in the following also as a database 28.

When the method for operating an inverter 16 is performed, the following method steps are executed:

Firstly, a respective line angle φ is determined by measurement of the input voltages present at the inverter 16. This is used to specify a position of the rotating space vector 30.

By means of the determined line angle φ, a conducting state or transition state control set 32, 38 associated with the respective line angle φ is determined in the database 28 as a basis for control signals 20 for gate control of the semiconductor switches T1-T6. The control set 32, 38 determined in each case is also applied such that the control signals 20 resulting in each case are output and consequently a corresponding state/switch position of the semiconductor switches T1-T6 is effected.

In the snapshot shown in FIG. 3 the space vector 30 is initially located in the first sector 34 ($0°+\phi_v<\phi<60°-\phi_v$) and accordingly the first conducting state control set 32 ("−", "0", "+") is active. This causes the phases L1 and L3 to be switched to the intermediate circuit 22. If the respective line angle φ is determined continuously or at predefined or predefinable, in particular equidistant, time instants, the space vector 30 rotates, in this case for example in a counterclockwise direction.

In the situation assumed here, the space vector 30 therefore rotates in the direction of the sector having a first transition state control set 38 following on in the counterclockwise direction from the current sector 34 having the first conducting state control set 32. During the transition to the sector 36 having the transition state control set 38 and generally during the transition from a conducting state control set 32 to a transition state control set 38, a new gate control of the semiconductor switches T1-T6 takes place according to the control signals 20 resulting on account of the respective transition state control set 38. During the transition to the first transition state control set 38 the previously active phase L1 is in this case short-circuited with the phase L2 that is to be commutated up in the next sector 34.

Thus, no commutation yet takes place with the validity of a transition state control set 38. At least the commutation does not yet take place immediately with the validity of a transition state control set 38. The commutation can, however, take place during the entire further validity of the transition state control set 38.

For this purpose the input voltages of the inverter 16 are monitored during the validity of a transition state control set 38. When a predefined or predefinable condition in relation to the monitored input voltages is reached, the next-following conducting state control set 32 in the respective direction of rotation of the space vector 30 is selected. With the succeeding application of the selected conducting state control set 32, a new gate control of the semiconductor switches T1-T6 takes place together with a commutation according to the control signals 20 resulting on account of said conducting state control set 32. The condition used for initiating the commutation can for example mean that the monitored input voltages are checked for equality. Then the commutation takes place and the transition to the next conducting state control set 32 is made if the voltage across the down-commutated phase has fallen so far that it reaches the level of the voltage across the up-commutated phase.

If no fulfillment of the condition monitored in each case for the commutation has occurred during the entire period of validity of a transition state control set 38, a switchover to the next-following conducting state control set 32 in the direction of rotation of the space vector 30 is made at the end of the period of validity of the transition state control set 38. This effectively constitutes a forced commutation, such that in any event a commutation takes place at the latest at the end of the period of validity of a transition state control set 38.

Irrespective of a commutation during the period of validity of a transition state control set 38 or at the end of the period of validity of a transition state control set 38, it is provided at any time instant, i.e. at any line angle φ, that a preceding sector 34, starting from the respective line angle φ in the direction of rotation of the space vector 30, the underlying control set 32 of which sector 34 has already been used as a basis for control signals 20 is blocked. This prevents a preceding, already used conducting state control set 32 from being used again for gate control of the semiconductor switches T1-T6 after the commutation, i.e. after the activation of a new conducting state control set 32.

The result is that this prevents the switching over of the inverter 16 between two states that was sometimes observed formerly in practice. A switchover of said kind constitutes a miscommutation, which is now reliably avoided with the blocking of preceding conducting state control sets 32 in each case. Previously such a miscommutation could also occur at high frequencies due to repeated switching back and forth between two states. This could even lead to machine damage. This is likewise reliably avoided with the approach presented here.

Figure 5:
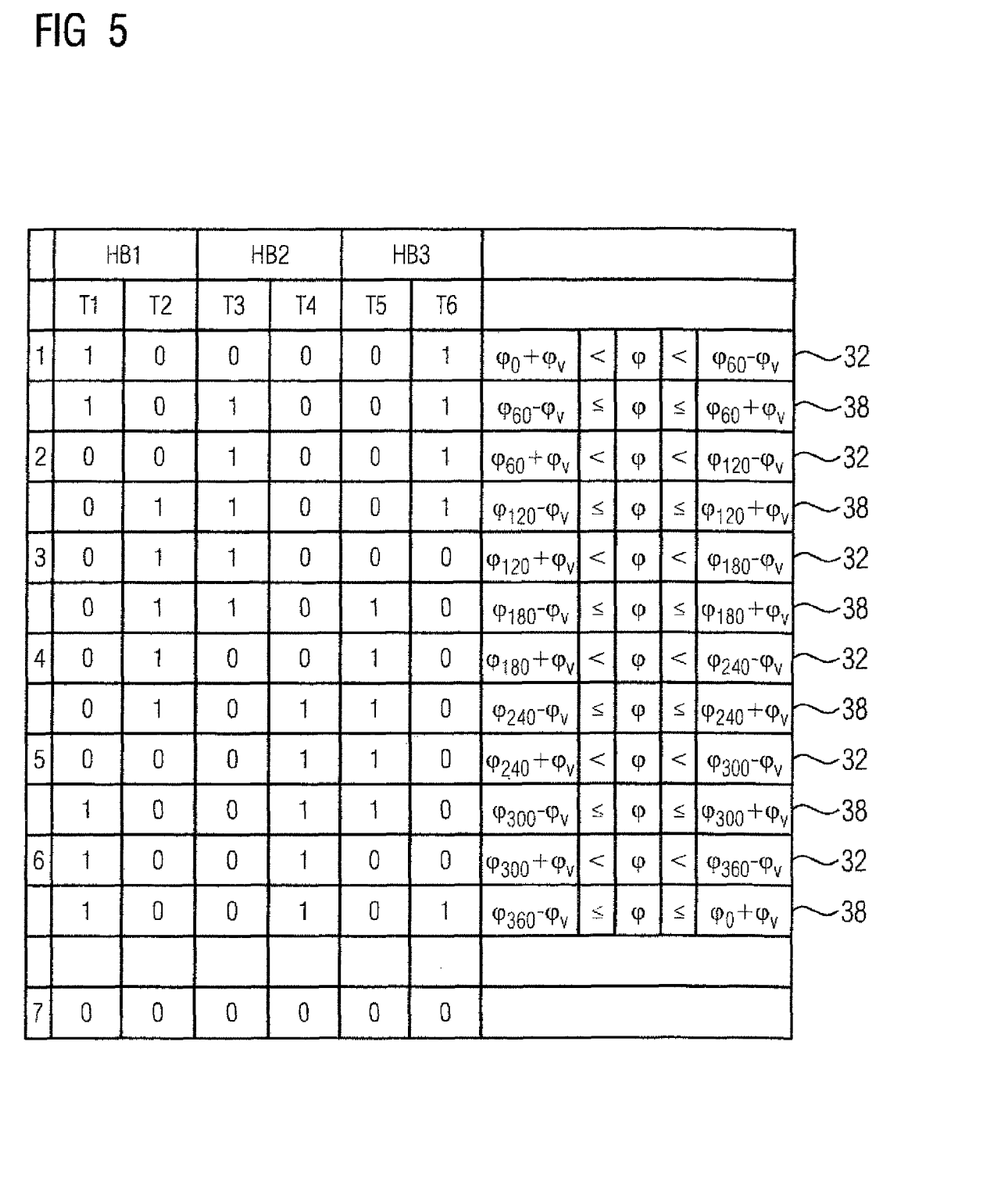
FIG. 5 is a tabular representation of the conducting and transition state control sets.

FIG. 5 shows in tabular form the conducting state control sets 32 and the transition state control sets 38. The sectors 34 of the space vector diagram (FIG. 3) are numbered in the left-hand column using the numerals 1, 2, 3 . . . , 6. The second and the third column include the states of the semiconductor switches T1, T2 incorporated in the first half-bridge HB1 resulting on account of the respective conducting and transition state control sets 32, 38. For this, the text "T1" is shown as column heading over the second column, which contains the states of the first semiconductor switch T1, and similarly the text "T2" is shown as column heading over the third column, which contains the states of the second semiconductor switch T2. The fourth and fifth column as well as the sixth and seventh column analogously contain the states of the semiconductor switches T3, T4; T5, T6 incorporated in the second and third half-bridge HB2, HB3, respectively, resulting on account of the respective conducting and transition state control sets 32, 38. Shown on the extreme right in the table is the respective line angle interval for which the relevant conducting and transition state control set 32, 38 is provided. It is apparent that the line angle intervals specifying a conducting state are reduced in each case by the aperture angle $\phi_v$ and that the line angle intervals specifying a transition state extend in each case by the aperture angle $\phi_v$ around the natural commutation points.

Also shown as the last row of the table in FIG. 5 is a further state in which all the semiconductor switches T1-T6 are deactivated (open, non-conducting). This state is used as the initial state during the synchronization to the power supply network. The zero vectors which were used for the space vector modulation and with which all three upper semiconductor switches T1, T3, T5 or all three lower semiconductor switches T2, T4, T6 were activated are now no longer required.

In the control program 28 it can easily be established using the line angle $\phi$ determined in each case by means of a suitable case discrimination, which conducting or transition state control set 32, 38 belongs to the current line angle $\phi$ at a given time. Once the control set 32, 38 associated with the current line angle $\phi$ at a given time has been established, it is used as a basis for gate control of the semiconductor switches T1-T6 of the inverter 16.

The totality of the control sets 32, 38 shown in FIG. 5 can be considered en bloc as the control set for the inverter 16.

Figure 6:
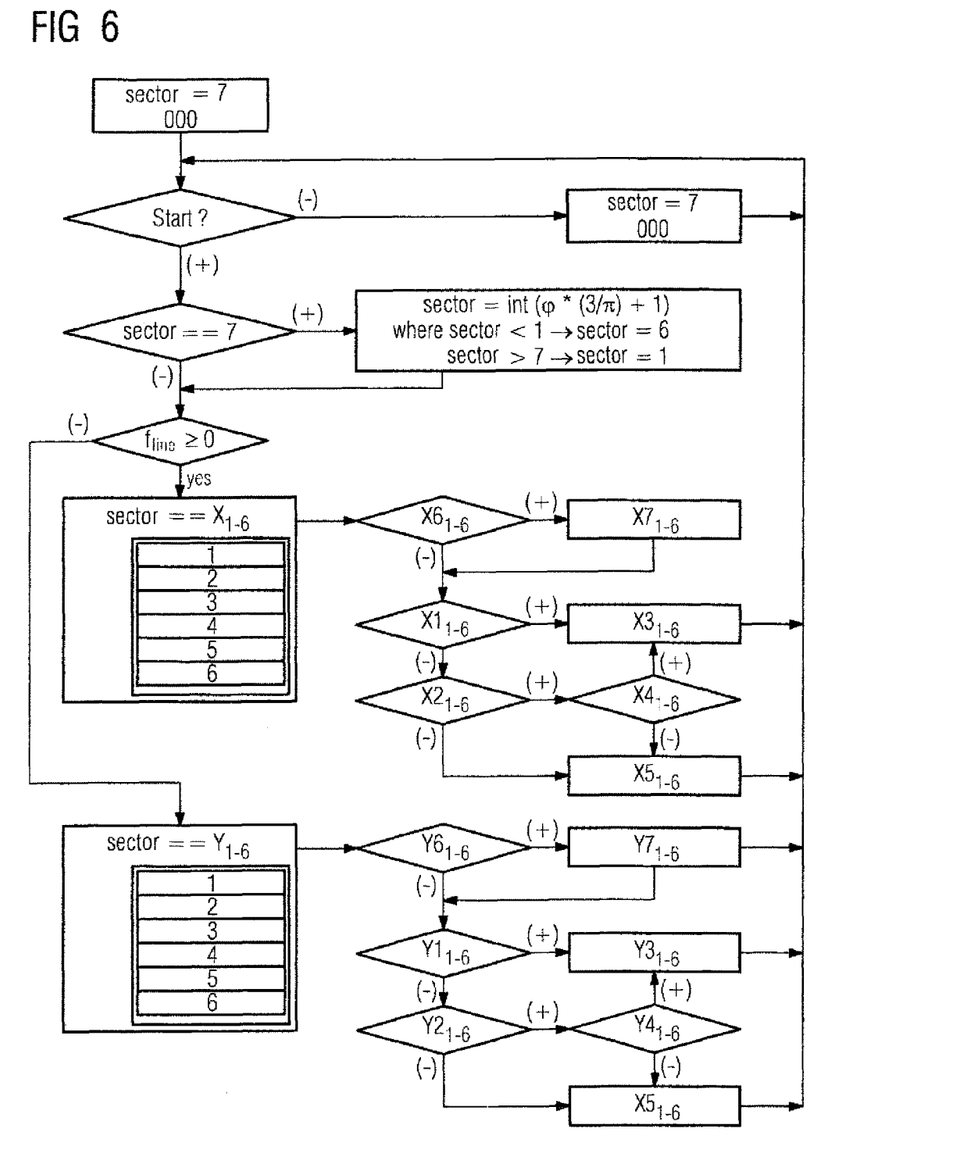
FIG. 6 is a flowchart for sector selection within the scope of the method described here.

In this regard FIG. 6 shows a flowchart for a possible implementation of a sector selection. In the diagram "(+)" against a condition tested in each case means that the tested condition has been fulfilled and thus designates a "yes branch" within the flowchart. Analogously, "(−)" designates a "no branch".

With the selection of a sector 34, the conducting state control set 32 that is to be used in each case is also established. In this regard, FIG. 7 shows the conditions tested within the scope of the flowchart according to FIG. 6. By means of the query "$f_{line} >= 0$" it is checked whether a forward or backward rotation is given.

If this condition is fulfilled, the conditions X1 to X7 for the forward run are tested in the order shown in the flowchart according to FIG. 6. The actual formulation of the individual conditions is yielded from the table in FIG. 7, and there specifically from the top half of the table (columns X1, X2, ... X7). Since each of these columns comprises six rows, the actual formulation of the condition results on the one hand from the designation specified in the flowchart and on the other hand from the respective sector 34 (FIG. 3) in which the space vector 30 is located at the current time. In this case the designation indicated in the flowchart specifies a column of the table and the respective sector 34 specifies a row of the table.

Thus, if the space vector 30 is located for example—as shown in FIG. 3—in the first sector 34, during the processing of the flowchart in FIG. 6, at the point where the condition designated by "$X6_{1-6}$" is tested, the condition specified in the table in FIG. 7 (in the top half thereof) in the column with the heading "X6" and in the first row thereof (on account of the first sector 34) is tested. The tested condition accordingly reads "$\phi > \phi_{300} - \phi_v$". If this condition is not fulfilled at the current time, a branch is made to test the condition designated by "$X1_{1-6}$". There, the condition actually to be tested is again selected with reference to the table in FIG. 7 (column headed "X1"; first row on account of the space vector 30 still being located in the first main sector). The condition actually tested therefore reads "$\phi < \phi_{60} - \phi_v$". In this way it is checked whether the space vector 30 is still located ahead of the sector of the space vector diagram assigned to a transition state control set 38. This is the case here (see snapshot in FIG. 3), so a branch is made to the instruction designated by "$X3_{1-6}$" and there the conducting state control set 32 is selected: "sector=1/+0−" (column headed "X3"; first row on account of the space vector 30 still being located in the first main sector).

If this condition has not been fulfilled, the space vector 30 is already located in the sector of the space vector diagram assigned to a transition state control set 38. In that case it is checked by means of the condition designated by "$X2_{1-6}$" whether the space vector 30 is still located within this sector or is already in the next sector 34 (condition "$\phi < \phi_{60} + \phi_v$"). If the condition has been fulfilled, i.e. the space vector 30 is still located in the sector of the space vector diagram assigned to a transition state control set 38, a branch is made to test the commutation condition (condition "$X4_{1-6}$"). Here too, the condition actually to be tested is again selected on the basis of the main sector in which the space vector 30 is located and the associated row. The condition to be tested in the case of a space vector 30 located in the first main sector accordingly reads: "adc_L1>adc_L2". In this case the symbolic identifier "adc_L1" means the analog-to-digital converted value of the voltage across the phase L1. Accordingly, the symbolic identifiers "adc_L2" and "adc_L3" denote the analog-to-digital converted value of the respective voltage across the phase L2 and L3 respectively. Depending on the result of the test of the commutation condition, either the already selected conducting state control set 32 remains active (branch to "$X3_{1-6}$") or a transition state control set 38 is selected (branch to "$X5_{1-6}$").

If the space vector 30 is already located in the next sector 34 when the condition designated by "$X2_{1-6}$" is tested, i.e. the condition has not been fulfilled, a branch is made directly to the instruction designated by "$X5_{1-6}$" and there the transition state control set 38 is selected: "sector=2/++−". With the now increased value of the variable "sector", which indicates that the space vector 30 is located in the second main sector, the forced commutation takes place during the next pass through the flowchart and the transition is made to the next conducting state control set 32. This is an example of an implementation of the feature whereby a switchover to the next-following conducting state control set 32 in the respective direction of rotation of the space vector 30 is made at the latest at the end of the period of validity of a transition state control set 38.

In the table, the variable ("sector") designating the current main sector in which the space vector 30 is located is increased only in the "forward direction" (column headed "X5"). In the sixth row, which is evaluated when the space vector 30 is located in the sixth main sector, a transition is possible to the first main sector following on from the sixth main sector (column "X6", row 6: "sector=1/+−−"). What is achieved in this way is that a preceding sector 34 in the direction of rotation of the space vector 30, the underlying control set 32 of which sector 34 has already been used as a basis for control signals 20, can never be selected. The sector is thus blocked.

What has been said above applies analogously to the succeeding main sectors in the space vector diagram. The aforesaid statements also apply analogously to rotation in the backward direction, with the exception that then the columns of the table that are headed "Y1, Y2, ..., Y6" are accessed (FIG. 7; bottom half).

Although the invention has been illustrated and described in greater detail on the basis of the exemplary embodiment, the invention is not limited by the disclosed example or examples, and other variations can be derived herefrom by the person skilled in the art without leaving the scope of protection of the invention.

Individual prevalent aspects of the description filed here can therefore be briefly summarized as follows:

Based on measurement of the three input voltages and subsequent coordinate transformation, a space vector 30 is formed which represents the line angle $\phi_v$, the line frequency f and the line amplitude. The direction of rotation can be determined on the basis of the line frequency f and the line angle cp. Following the synchronization to the power supply network the control set can now be released with the conducting state control sets 32 incorporated therein and the transition state control sets 38 likewise incorporated therein. In the embodiment variant described with reference to the figures, the control set is configured in such a way that there are seven main states in the form of the six conducting state control sets 32 plus the one state in which all the semiconductor switches T1-T6 are turned off, and six transition states in the form of the six transition state control sets 38. Based on the individual states 32, 38, fixed signal states are assigned in each case to the output drivers for the gate control of the semiconductor switches T1-T6. In contrast to the space vector control method, there is no high-frequency switching in the sectors 34, 36 between the different vectors that span the sector. Furthermore, the zero vectors which turn on all three upper semiconductor switches T1, T3, T5 or, as the case may be, all three lower semiconductor switches T2, T4, T6, are not required. Instead there is only the state in which all the semiconductor switches T1-T6 are turned off.

When a commutation sector 36 is reached, the relevant input voltages for the commutation are resorted to. If the input voltage between the two voltages that are to be commutated reaches the value assigned to the respective commutation sector 36 or the difference assigned to the respective commutation sector 36, the commutation sector 36 is switched for an adjustable period of time. After this time has elapsed, the commutation sector 36 automatically transitions into the following sector 34 (dependent on the direction of rotation). In this case it is only possible to move through the sectors 34, 36 as a function of the direction of rotation. Preceding sectors 34, 36 are blocked in order to avoid an undesirable oscillation between the two phases L1, L2, L3 that are to be commutated at a given time. A type of forced commutation is provided in addition. Should no commutation take place within the respective commutation sector 36, it will be initiated by force.

With the underlying size of the commutation sector 36 it is possible to make the time of the commutation switchover event dependent on different factors, for example on an essentially freely selectable aperture angle $\phi_v$. For example, an aperture angle of $\phi_v=3.6°$ comes into consideration for the commutation sectors 36. This is equivalent to a duration of the commutation sector 36 of ten microseconds.

In a nutshell, therefore, the invention is a method for operating an inverter 16 and an inverter 16 operating according to the method, wherein the inverter 16 is controlled in accordance with line-angle-specific control sets 32, 38 held available in a database and wherein a switchover from one control set 32, 38 to the next control set 32, 38 can take place only in a direction of rotation of the space vector 30 resulting from a respective line angle $\phi$.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating a three-phase inverter having controllable semiconductor switches, the method comprising:
    measuring input voltages present at the inverter for determining a line angle, and determining from the line angle a position of a rotating space vector,
    providing in a database a plurality of line-angle-specific control sets for conducting states (conducting state control sets) and a plurality of line-angle-specific control sets for transition states (transition state control sets),
    wherein each of the conducting state control sets is configured to activate precisely one upper semiconductor switch and precisely one lower semiconductor switch of the inverter,
    wherein each of the transition state control sets is configured to activate precisely two upper or lower semiconductor switches and to activate precisely one lower or upper semiconductor switch of the inverter,
    wherein the conducting state control sets and the transition state control sets define sectors which succeed one another alternately and in an at least partially overlapping fashion in a direction of rotation of the rotating space vector,
    determining in the database a conducting state control set or transition state control set associated with the determined line angle as a basis for control signals for controlling the semiconductor switches,
    during a transition from a conducting state control set to a transition state control set, controlling the semiconductor switches with new control signals in accordance with the control signals based on the transition state control set,
    when a transition state control set is valid, monitoring the input voltages of the inverter and selecting, when the monitored input voltages satisfy a predefined condition, the next-following conducting state control set in the respective direction of rotation of the space vector, and controlling and commutating the semiconductor switches with new control signals in accordance with the control signals based on the conducting state control set, and
    blocking a sector having a conducting state control set or a transition state control set that was already used as a basis for the control signals, wherein the blocked sector is disposed prior in relation to the line angle in the direction of rotation of the space vector.

2. The method of claim 1, wherein the inverter is incorporated in a drive control unit.

3. The method of claim 1, further comprising switching to the next-following conducting state control set in the direction of rotation of the space vector at the latest at an end of a period of validity of the transition state control set.

4. The method of claim 1, wherein monitoring the input voltages comprises checking whether the monitored input voltages are identical.

5. The method of claim 1, wherein the database comprises at least six conducting state control sets and at least six transition state control sets, for a total of at least twelve control sets.

6. The method of claim 1, further comprising defining an aperture angle representing a width of the transition states, and consequently a range of validity of the transition state control sets.

7. The method of claim 1, further comprising providing in the database a deactivation control set configured to deactivate all upper and lower semiconductor switches of the inverter.

8. The method of claim 7, wherein the deactivation control set is used to synchronize the inverter with a power grid or in the event of a fault.

9. A computer program embodied in a non-transitory computer-readable medium, wherein the computer program, when executed as a control program on an inverter control device of a drive control unit of a three-phase inverter having controllable semiconductor switches, causes the inverter control device to:

measure input voltages present at the inverter for determining a line angle, and determining from the line angle a position of a rotating space vector, provide in a database a plurality of line-angle-specific control sets for conducting states (conducting state control sets) and a plurality of line-angle-specific control sets for transition states (transition state control sets), wherein each of the conducting state control sets is configured to activate precisely one upper semiconductor switch and precisely one lower semiconductor switch of the inverter, wherein each of the transition state control sets is configured to activate precisely two upper or lower semiconductor switches and to activate precisely one lower or upper semiconductor switch of the inverter, wherein the conducting state control sets and the transition state control sets define sectors which succeed one another alternately and at least partially overlapping in a direction of rotation of the rotating space vector, determine in the database a conducting state control set or transition state control set associated with the determined line angle as a basis for control signals for controlling the semiconductor switches, during a transition from a conducting state control set to a transition state control set, control the semiconductor switches with new control signals in accordance with the control signals based on the transition state control set, when a transition state control set is valid, monitor the input voltages of the inverter and select, when the monitored input voltages satisfy a predefined condition, the next-following conducting state control set in the respective direction of rotation of the space vector, and control and commutate the semiconductor switches with new control signals in accordance with the control signals based on the conducting state control set, and block a sector having a conducting state control set or a transition state control set that was already used as a basis for the control signals, wherein the blocked sector is disposed prior in relation to the line angle in the direction of rotation of the space vector.

10. An inverter control device for operating a three-phase inverter having controllable semiconductor switches, the inverter control device comprising:

a processor, and a memory into which a computer program is loaded as control program, with the control program causing the processor during operation of the inverter control device to:

measure input voltages present at the inverter for determining a line angle, and determining from the line angle a position of a rotating space vector, provide in a database a plurality of line-angle-specific control sets for conducting states (conducting state control sets) and a plurality of line-angle-specific control sets for transition states (transition state control sets), wherein each of the conducting state control sets is configured to activate precisely one upper semiconductor switch and precisely one lower semiconductor switch of the inverter, wherein each of the transition state control sets is configured to activate precisely two upper or lower semiconductor switches and to activate precisely one lower or upper semiconductor switch of the inverter, wherein the conducting state control sets and the transition state control sets define sectors which succeed one another alternately and at least partially overlapping in a direction of rotation of the rotating space vector, determine in the database a conducting state control set or transition state control set associated with the determined line angle as a basis for control signals for controlling the semiconductor switches, during a transition from a conducting state control set to a transition state control set, control the semiconductor switches with new control signals in accordance with the control signals based on the transition state control set, when a transition state control set is valid, monitor the input voltages of the inverter and select, when the monitored input voltages satisfy a predefined condition, the next-following conducting state control set in the respective direction of rotation of the space vector, and control and commutate the semiconductor switches with new control signals in accordance with the control signals based on the conducting state control set, and block a sector having a conducting state control set or a transition state control set that was already used as a basis for the control signals, wherein the blocked sector is disposed prior in relation to the line angle in the direction of rotation of the space vector.

11. A drive control unit comprising an inverter control device for operating a three-phase inverter having controllable semiconductor switches, the inverter control device comprising:

a processor, and a memory into which a computer program is loaded as control program, with the control program, when executed by the processor, causing the processor during operation of the inverter control device to:

measure input voltages present at the inverter for determining a line angle, and determining from the line angle a position of a rotating space vector, provide in a database a plurality of line-angle-specific control sets for conducting states (conducting state control sets) and a plurality of line-angle-specific control sets for transition states (transition state control sets), wherein each of the conducting state control sets is configured to activate precisely one upper semiconductor switch and precisely one lower semiconductor switch of the inverter, wherein each of the transition state control sets is configured to activate precisely two upper or lower semiconductor switches and to activate precisely one lower or upper semiconductor switch of the inverter, wherein the conducting state control sets and the transition state control sets define sectors which succeed one another alternately and at least partially overlapping in a direction of rotation of the rotating space vector, determine in the database a conducting state control set or transition state control set associated with the determined line angle as a basis for control signals for controlling the semiconductor switches, during a transition from a conducting state control set to a transition state control set, control the semiconductor switches with new control signals in accordance with the control signals based on the transition state control set, when a transition state control set is valid, monitor the input voltages of the inverter and select, when the monitored input voltages satisfy a predefined condition, the next-following conducting state control set in the respective direction of rotation of the space vector, and control and commutate the semiconductor switches with new control signals in accordance with the control signals based on the conducting state control set, and block a sector having a conducting state control set or a transition state control set that was already used as a basis for the control signals, wherein the blocked sector is disposed prior in relation to the line angle in the direction of rotation of the space vector.

* * * * *